(12) United States Patent
Jung

(10) Patent No.: US 9,789,910 B2
(45) Date of Patent: Oct. 17, 2017

(54) ENGINE COVER MADE FROM CARBON FIBER AND ALLOY

(71) Applicant: COBRA KING INDUSTRY CO., LTD., Yun Lin Hsien (TW)

(72) Inventor: Wu-Chung Jung, Yun Lin Hsien (TW)

(73) Assignee: Cobra King Industry Co., Ltd., Yun Lin Hsien (TW)

( * ) Notice: Subject to any disclaimer, the term of this patent is extended or adjusted under 35 U.S.C. 154(b) by 21 days.

(21) Appl. No.: 15/045,438

(22) Filed: Feb. 17, 2016

(65) Prior Publication Data
US 2017/0080984 A1 Mar. 23, 2017

(30) Foreign Application Priority Data
Sep. 21, 2015 (TW) .............................. 104215180 U

(51) Int. Cl.
*B62D 25/10* (2006.01)
*B29C 65/00* (2006.01)
*B29K 105/00* (2006.01)
*B29K 105/06* (2006.01)
*B29L 31/30* (2006.01)

(52) U.S. Cl.
CPC ............ *B62D 25/10* (2013.01); *B29C 66/304* (2013.01); *B29C 66/742* (2013.01); *B62D 25/105* (2013.01); *B29K 2105/0097* (2013.01); *B29K 2105/06* (2013.01); *B29L 2031/3002* (2013.01)

(58) Field of Classification Search
CPC ...... B29C 66/742; B62D 25/10; B62D 25/105
USPC ........................................ 296/76, 191, 193.11
See application file for complete search history.

(56) References Cited

U.S. PATENT DOCUMENTS

| | | | | |
|---|---|---|---|---|
| 8,895,132 | B2 * | 11/2014 | Spencer ................. | B60J 5/0469 156/226 |
| 2016/0114526 | A1 * | 4/2016 | Inoh .................. | B29C 66/72141 264/257 |

* cited by examiner

*Primary Examiner* — Jason S Daniels
(74) *Attorney, Agent, or Firm* — Rosenberg, Klein & Lee

(57) ABSTRACT

An engine cover made from carbon fiber and alloy is revealed. The engine cover made from carbon fiber and alloy includes an inner layer made from alloy, an outer layer made from carbon fiber and an adhesive. A connecting edge is disposed around the inner layer made from alloy and a plurality of insertion holes is arranged at the connecting edge. A bent part is set on the outer layer made from carbon fiber and located corresponding to the connecting edge. The bent part is covered around and over the connecting edge. The adhesive is filled into each insertion hole for connecting the outer layer made from carbon fiber to the inner layer made from alloy. Thereby the engine cover has light weight, good thermal stability, radiation resistance, water resistance, corrosion resistance etc. Moreover, the shock absorption is achieved due to the adhesive.

7 Claims, 4 Drawing Sheets

ENGINE COVER MADE FROM CARBON FIBER AND ALLOY

BACKGROUND OF THE INVENTION

Field of the Invention

The present invention relates to an engine cover made from carbon fiber and alloy, especially to an engine cover made from carbon fiber and alloy that features on light weight, increased structural strength, and higher bonding strength.

Descriptions of Related Art

A vehicle is a necessity for most people in an affluent society. Along with progress in the vehicle technology, driver's safety and convenience in use have received great attention. Vehicle safety technology has become one of the development priorities in the automotive industry to ensure the safety and security of automobiles and passengers.

Generally, a plurality of parts including an engine, a radiator, a battery, etc. is mounted in an engine room. An engine cover disposed over the engine room is lifted up for repair or maintenance. Moreover, the engine cover also protects important components located in the engine room. During movement, the appearance of the vehicles, especially the vehicle head, is easy to have collision, vibration, or impact caused by stones. For driver's security and safety, the engine cover is made from metal alloy with higher strength. For example, the engine cover is formed by an inner layer and an outer layer, both made from iron aluminum alloy. The edge of the outer layer is covered over the edge of the inner layer and then is fixed on the edge of the inner layer by welding. However, the engine cover with such design has the following shortcomings.

1. The huge engine cover made from metal is quite heavy. This has negative effect on fuel consumption and vehicle speed.
2. The engine cover formed by the inner layer and the outer layer welded to each other has strong rigidity. Thus the engine cover is easy to get deformed due to collision or shock.

Thus there is room for improvement and a need to provide a novel design of the engine cover.

SUMMARY OF THE INVENTION

Therefore it is a primary object of the present invention to provide an engine cover made from carbon fiber and alloy and having properties of light weight, higher structural strength and improved bonding strength.

In order to achieve the above object, an engine cover made from carbon fiber and alloy according to the present invention includes an inner layer made from alloy, an outer layer made from carbon fiber and an adhesive. A connecting edge is disposed around the inner layer made from alloy and a plurality of insertion holes is arranged at the connecting edge. A bent part is set on the outer layer made from carbon fiber and located corresponding to the connecting edge. The bent part is covered around and over the connecting edge. Each insertion hole is filled with the adhesive so as to connect the carbon fiber outer layer to the alloy inner layer. Thereby the engine cover features on light weight, good thermal stability, radiation resistance, water resistance, corrosion resistance etc. Moreover, the shock absorption is achieved by the adhesive.

The outer layer made from carbon fiber is a multi-layer structure having a layer of carbon fiber fabric, a resin layer, a layer of carbon fiber fabric, a resin layer, a layer of glass fiber cloth, a resin layer, and a layer of glass fiber cloth from top to bottom.

The inner layer made from alloy is also a multi-layer structure formed by an aluminum alloy layer, a resin layer, a layer of glass fiber cloth, a resin layer, and a layer of glass fiber cloth from top to bottom.

The adhesive is made from fiber reinforced polymer (FRP) composite.

The distance between two adjacent insertion holes on the connecting edge is ranging from 12 centimeters (cm) to 15 cm.

Compared with the structure available now, the present invention has the following advantages:
1. The weight of the entire vehicle is reduced by light-weight design of the carbon fiber outer layer. Thus the vehicle speed can be increased.
2. The engine cover made from carbon fiber and alloy features on good thermal stability, radiation resistance, water resistance, corrosion resistance etc., due to properties of the carbon fiber of the outer layer.
3. The adhesive is made from fiber reinforced polymer composite so that all the connection area of the engine cover has certain strength. Moreover, the shock absorption and shock resistance are achieved by the properties of the resin.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
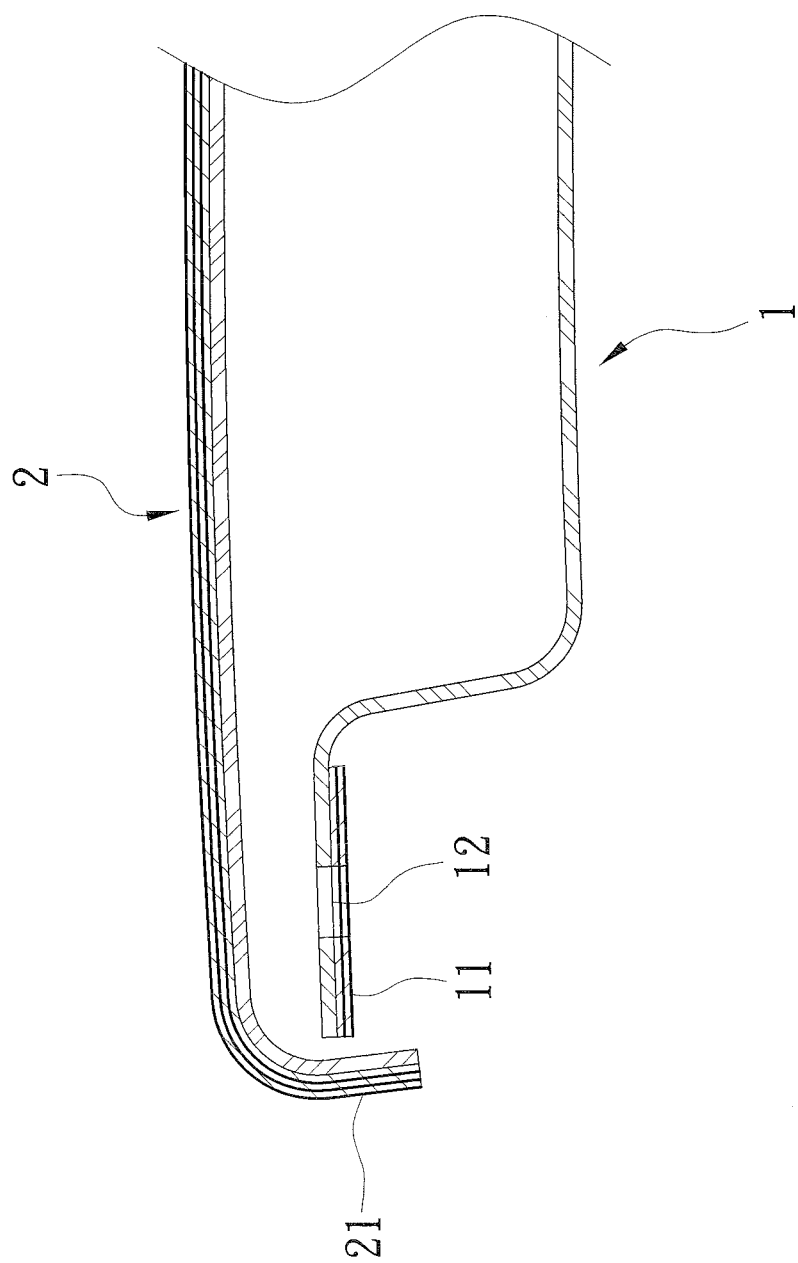
FIG. 1 is a longitudinal sectional view showing an inner layer and an outer layer of an embodiment according to the present invention.
Figure 2:
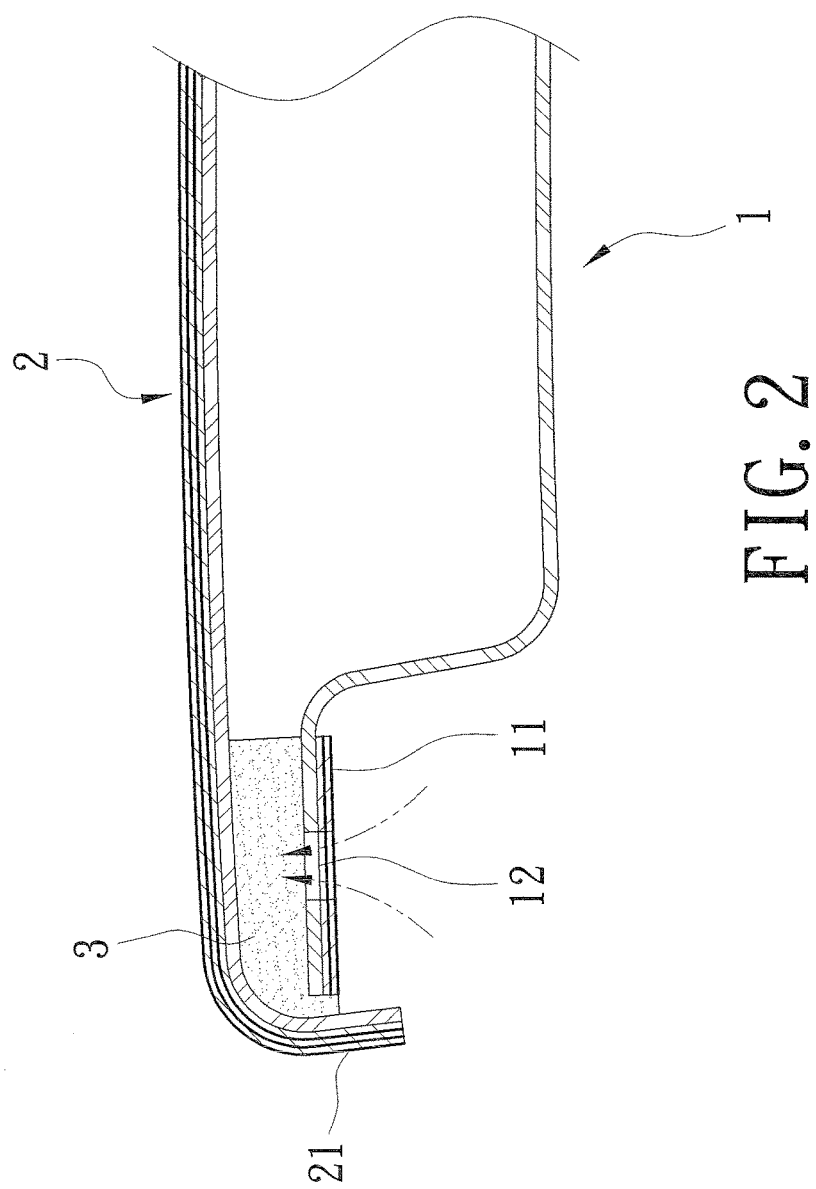
FIG. 2 is a longitudinal sectional view showing an embodiment filled with an adhesive according to the present invention.
Figure 3:
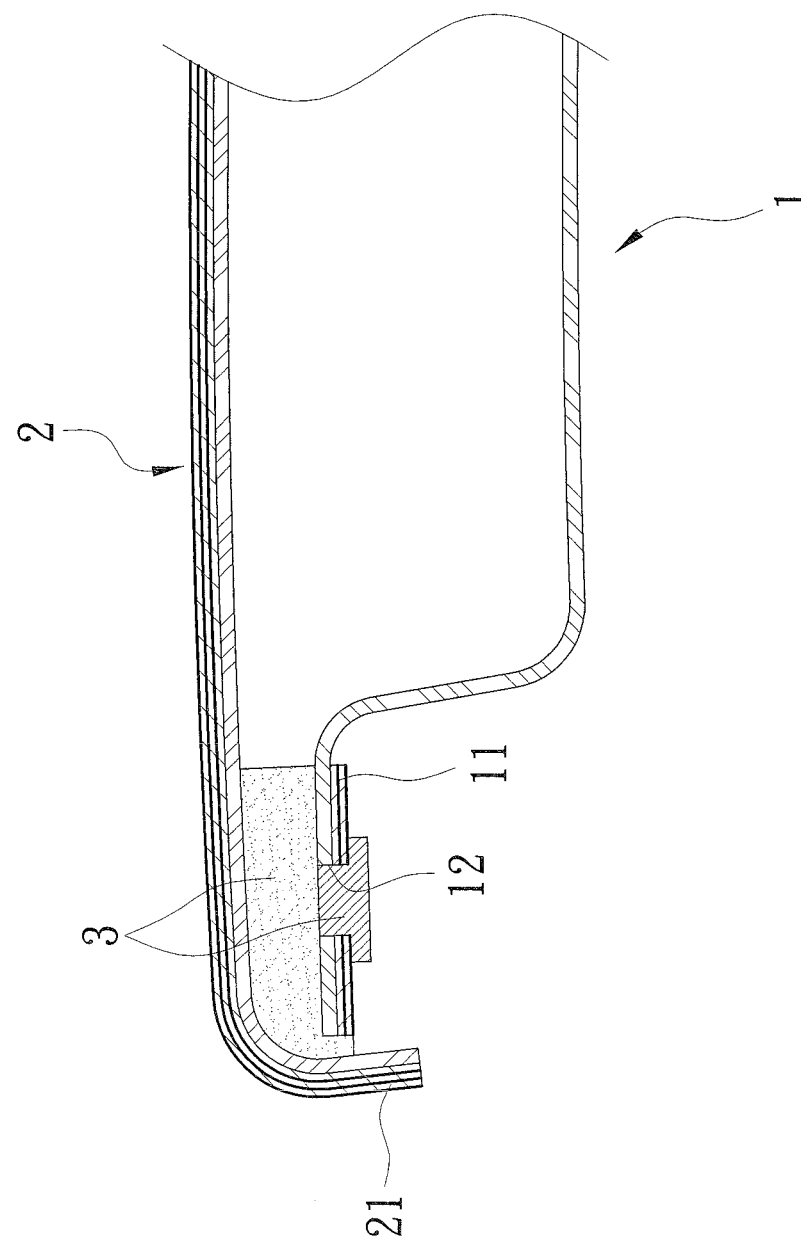
FIG. 3 is a longitudinal sectional view showing an assembled embodiment according to the present invention.
Figure 4:
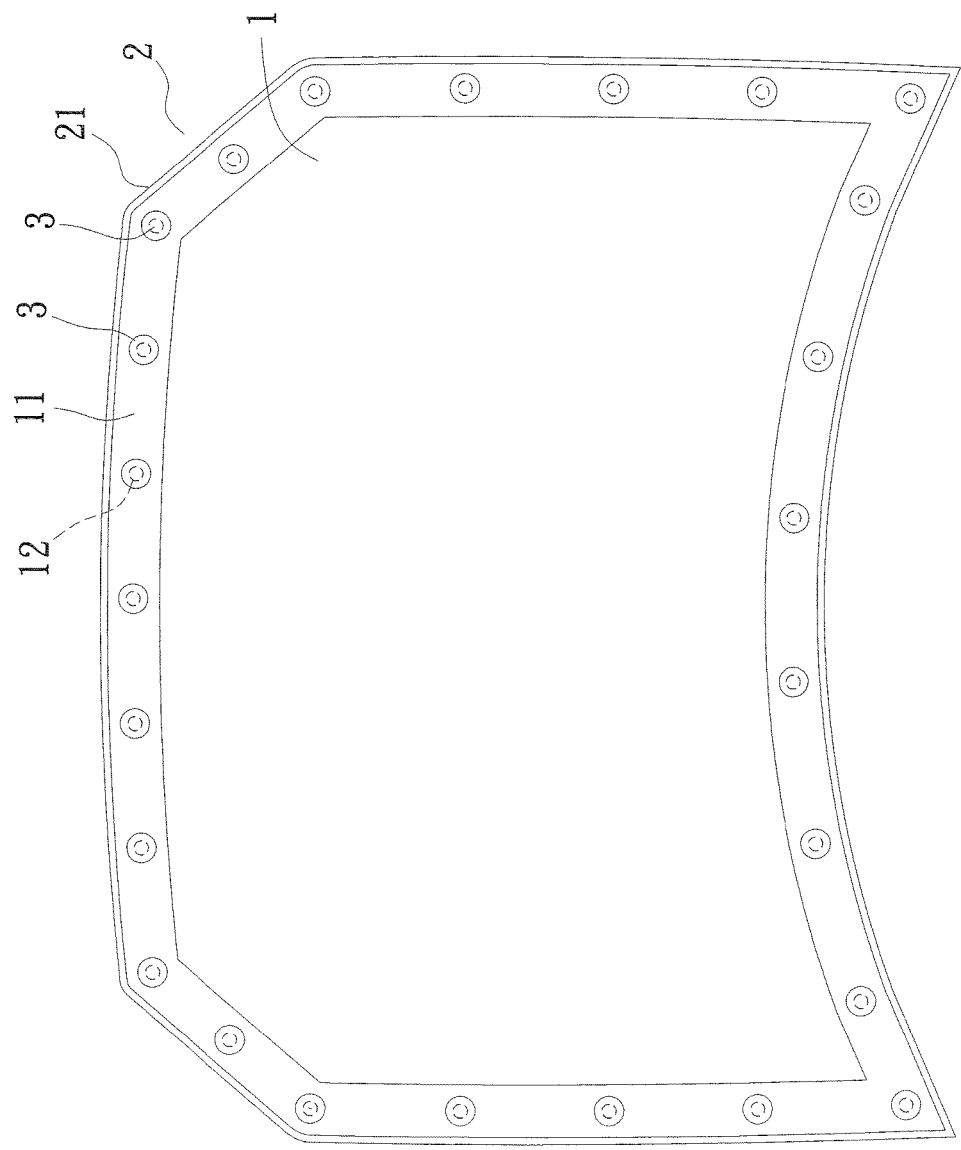
FIG. 4 is a perspective view of an embodiment according to the present invention.

Refer to FIG. 1, FIG. 2 and FIG. 3, an engine cover made from carbon fiber and alloy of the present invention includes an inner layer made from alloy 1, an outer layer made from carbon fiber 2 and an adhesive 3. A connecting edge 11 is disposed around the inner layer made from alloy 1 and a plurality of insertion holes 12 is arranged at the connecting edge 11. A bent part 21 is set on the outer layer made from carbon fiber 2 and located corresponding to the connecting edge 11. The bent part 21 is covered around and over the connecting edge 11. The adhesive 3 is filled into each of the insertion holes 12 for connecting and fixing the outer layer made from carbon fiber 2 to the inner layer made from alloy 1.

Refer from FIG. 1 to FIG. 4, the shape of the inner layer made from alloy 1 and that of the outer layer made from carbon fiber 2 are determined according to requirements of the vehicles. Then the connecting edge 11 is formed around the inner layer made from alloy 1. The insertion holes 12 are arranged at the connecting edge 11 circularly. Next the bent part 21 is formed on the outer layer made from carbon fiber 2 at the position corresponding to the insertion holes 12. The bent part 21 is covered around and over the connecting edge 11. Then the insertion holes 12 on the connecting edge 11 are filled with the adhesive 3 respectively so as to fix the inner layer made from alloy 1 and the outer layer made from carbon fiber 2 with each other.

The outer layer made from carbon fiber 2 is a multi-layer structure having a layer of carbon fiber fabric, a resin layer, a layer of carbon fiber fabric, a resin layer, a layer of glass fiber cloth, a resin layer, and a layer of glass fiber cloth from top to bottom. The inner layer made from alloy 1 is also a multi-layer structure consisting of an aluminum alloy layer, a resin layer, a layer of glass fiber cloth, a resin layer, and a layer of glass fiber cloth from top to bottom. In order to achieve certain connection strength, the distance between two adjacent insertion holes 12 on the connecting edge 11 is ranging from 12 centimeters (cm) to 15 cm while 15 cm is preferred. As to the adhesive 3, it is made from fiber reinforced polymer (FRP) composite.

In summary, compared with the structure available now, the present invention provides the following advantages:
1. The weight of the entire vehicle is reduced by light-weight design of the carbon fiber outer layer. Thus a higher vehicle speed can be attained.
2. The engine cover made from carbon fiber and alloy features on good thermal stability, radiation resistance, water resistance, corrosion resistance etc., due to properties of the carbon fiber of the outer layer.
3. The adhesive is made from fiber reinforced polymer composite so that all the connection area of the engine cover has certain strength. At the same time, the shock absorption and shock resistance are achieved by the properties of the resin.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An engine cover made from carbon fiber and alloy comprising:
    an inner layer made from alloy; and
    an outer layer made from carbon fiber;
    wherein a connecting edge is disposed at the inner layer made from alloy and a plurality of insertion holes are arranged on the connecting edge;
    wherein a bent part is formed on the outer layer made from carbon fiber and located corresponding to the connecting edge; and the bent part being covered around and over the connecting edge;
    wherein each of the insertion holes are filled with an adhesive for connecting and fixing the outer layer made from carbon fiber to the inner layer made from alloy;
    wherein the outer layer made from carbon fiber is a multi-layered structure, the outer layer from top to bottom respectively including a layer of carbon fiber fabric, a resin layer, a layer of carbon fiber fabric, a resin layer, a layer of glass fiber cloth, a resin layer, and a layer of glass fiber cloth.

2. The device as claimed in claim 1, wherein the inner layer made from alloy is a multi-layered structure, the inner layer from top to bottom respectively including an aluminum alloy layer, a resin layer, a layer of glass fiber cloth, a resin layer, and a layer of glass fiber cloth.

3. The device as claimed in claim 2, wherein the adhesive is made from fiber reinforced polymer (FRP) composite.

4. The device as claimed in claim 3, wherein a distance between the two adjacent insertion holes on the connecting edge is ranging from 12 centimeters (cm) to 15 centimeters (cm).

5. An engine cover made from carbon fiber and alloy comprising:
    an inner layer made from alloy; and
    an outer layer made from carbon fiber;
    wherein a connecting edge is disposed at the inner layer made from alloy and a plurality of insertion holes are arranged on the connecting edge;
    wherein a bent part is formed on the outer layer made from carbon fiber and located corresponding to the connecting edge; and the bent part being covered around and over the connecting edge;
    wherein each of the insertion holes are filled with an adhesive for connecting and fixing the outer layer made from carbon fiber to the inner layer made from alloy;
    wherein the inner layer made from alloy is a multi-layered structure, the inner layer from top to bottom respectively including an aluminum alloy layer, a resin layer, a layer of glass fiber cloth, a resin layer, and a layer of glass fiber cloth.

6. The device as claimed in claim 5, wherein the adhesive is made from fiber reinforced polymer (FRP) composite.

7. The device as claimed in claim 5, wherein a distance between the two adjacent insertion holes on the connecting edge is ranging from 12 centimeters (cm) to 15 centimeters (cm).

* * * * *